United States Patent Office 3,356,514
Patented Dec. 5, 1967

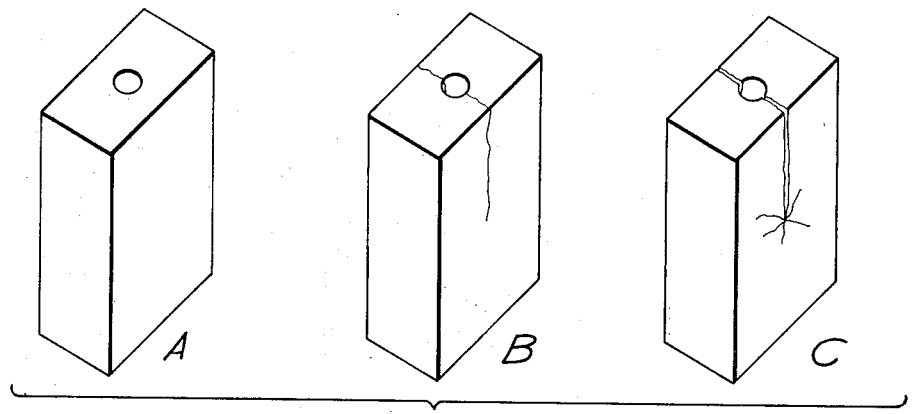
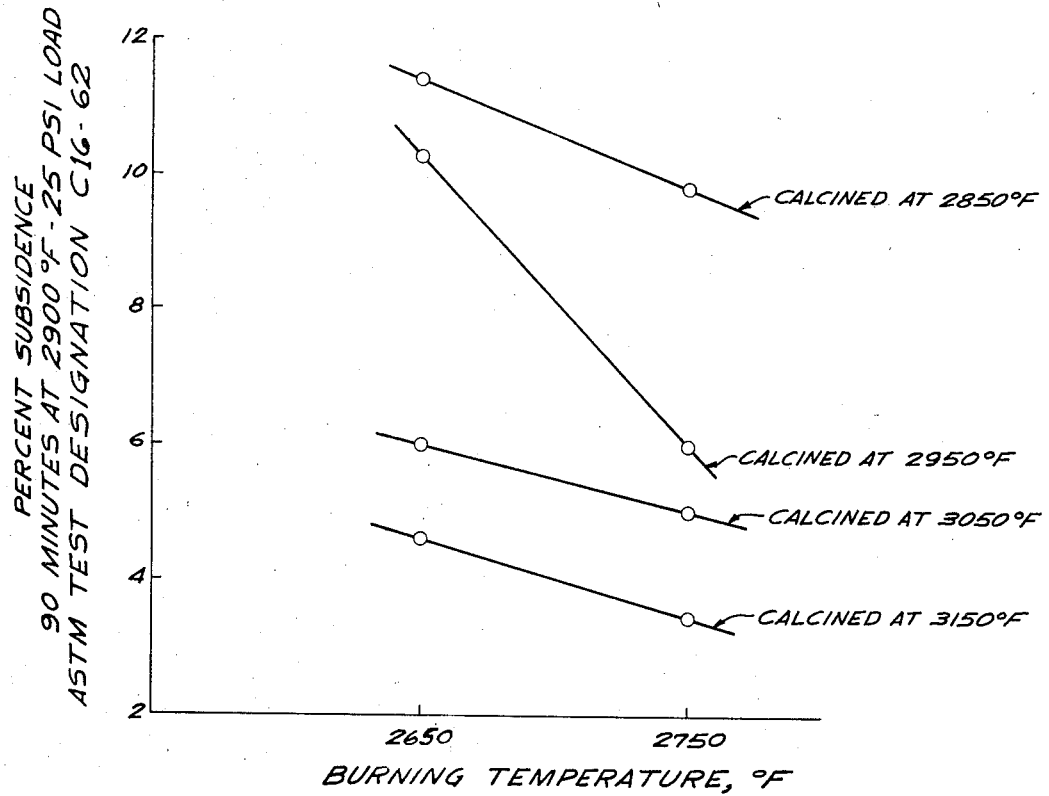

3,356,514
ALUMINA REFRACTORIES
Berhl E. Wishon, 5428 Florida Ave., Bethel Park, Pa. 15102, and Stanley R. Pavlica, 1012 Robbin Station, Irwin, Pa. 15642
Filed Feb. 23, 1966, Ser. No. 529,538
4 Claims. (Cl. 106—65)

ABSTRACT OF THE DISCLOSURE

A method of making a fired, high alumina refractory of bauxitic kaolin including the steps of calcining the bauxitic kaolin above 2950° F., making a brick batch and burning the brick in the range 2750–2850° F. to recover shapes of increased resistance to load and alkali slag at elevated temperatures.

---

This invention is closely related to application Ser. No. 470,858, entitled, "Alumina Refractories." That application is now United States Patent No. 3,241,989. Its relation to that application and patent is best seen by the following data and particularly the table in column 2. The present case is, in essence, an improvement, since it provides superior alkali slag resistance and subsidence under load as compared to brick of the patent. The chemistry of the brick of the present invention and that of the patent are substantially identical.

High alumina refracories are generally classified by their $Al_2O_3$ content into groups having 50, 60, 70, 80, 90, or 99% $Al_2O_3$, on the basis of an oxide analysis. Those containing 50 to 90% of $Al_2O_3$ are made by blending various high alumina refractory materials, while those of the 99% content are made from high-purity synthetic alumina, such as tabular alumina. Exemplary materials and typical $Al_2O_3$ contents therefor are as follows: tabular alumina 99%, calcined South American bauxite 89%, calcined Alabama bauxite 75%, calcined diaspore 74%, calcined kyanite 56%, and bauxitic kaolin 59%.

Mineralogically speaking, Alabama bauxite is about 40 parts kaolinite and 60 parts gibbsite. Bauxitic kaolin is about 30 parts gibbsite and 70 parts kaolinite.

It is an object of this invention to provide high alumina refractory shapes, the major portion of which consists of a calcined bauxitic kaolin, which are characterized by high density and strength, increased load-bearing strength, and resistance to alkali attack at elevated temperatures. It is another object of this invention to provide improved high alumina refractory shapes and a process for the fabrication thereof, which are particularly suited for the manufacture of the brick. However, there is a practical upper limit to the burning temperature around 2850° F. above which warping and cracking occurs. This process limitation has in the past limited the properties that could be developed in the brick. Applicants have found that by calcining the raw material used in the coarse fraction of a high alumina brick mix above a critical temperature and, thereafter, burning the brick above a critical temperature somewhat below the practical upper temperature limit, a high alumina brick having unexpectedly superior high-temperature load strength and alkali slag resistance is produced.

Briefly, according to one aspect, a fired high alumina refractory shape is made from a size graded batch consisting essentially of, by weight, 50–90% calcined bauxitic kaolin. The remainder of the batch is a material selected from the group consisting of finely divided calcined or crude aluminum ores, finely divided calcined or crude kaolin, and finely divided ball clay, substantially all passing a 100 mesh screen. The raw materials are selected so that no more than about 1%, by weight, alkalies are present in the batch. The calcined bauxitic kaolin is mineralogically characterized as mullite with an excess of silica. The silica is substantially all cristobalite. This mineralogical character is obtained by calcining the crude bauxitic kaolin to a temperature in excess of 2950° F. and, preferably, about 3050° F. Higher temperatures can be used, depending upon the capabilities of the vessel employed for calcining. The above described batch is pressed into brick and burned in excess of about 2750° F.

FIG. 1 is a pictorial view of three brick which have been submitted to a special alkali cup slag test;

FIG. 2 is a graphical comparison of the effects of calcining temperature and burning temperature and resistance to compressive loads at elevated temperatures.

The invention will be more clearly understood by a study of the following examples. A group of batches of bauxitic kaolin were prepared by calcining the material at about 2850, 2950, 3050, and 3150° F. The batches were sized and graded and combined with 25% calcined Alabama bauxite ball mill fines and 15% air-floated ball clay to form brickmaking batches. These batches were pressed into brick at about 8000 p.s.i., and dried for about five hours at 250° F. One-half of the brick (I–IV) made from each batch were burned at about 2650° F., which is known in the industry as a cone 16–17 burn. The other half (V–VIII) were burned at about 2750° F., which is known in the industry as a cone 18–19 burn.

These brick were then tested for physical properties, resistance to loads at elevated temperatures, and resistance to alkali slag attack. Table I includes the batches of the exemplary brick, along with their tested properties.

TABLE I

| Mix. No. | I | II | III | IV | V | VI | VII | VIII |
|---|---|---|---|---|---|---|---|---|
| Base Mix, Percent: | | | | | | | | |
| Calcined Bauxitic Kaolin | 60 | 60 | 60 | 60 | 60 | 60 | 60 | 60 |
| Calcined Alabama Bauxite (ball milled fines) | 25 | 25 | 25 | 25 | 25 | 25 | 25 | 25 |
| Air-floated Ball Clay | 15 | 15 | 15 | 15 | 15 | 35 | 15 | 15 |
| Temperature of Calcination of Kaolinitic Bauxite (° F.) | 2,850 | 2,950 | 3,050 | 3,150 | 2,850 | 2,950 | 3,050 | 3,150 |
| Burning Temperature of Brick | 2,750° F. (Cone 18–19) | | | | 2,650° F. (Cone 16–17) | | | |
| Bulk Density, pcf | 157 | 157 | 159 | 157 | 158 | 157 | 156 | 156 |
| Load Test, 25 p.s.i., Linear Subsidence at 2,900° F. (90 min.) | 9.7 | 6.0 | 4.8 | 3.3 | 11.5 | 10.5 | 5.9 | 3.7 |
| Special Alkali Cup Slag Test, Degree of Cracking (See Fig. 1) | B | A | A | A | C | B | B | B |

A=None; B=Moderate; C=Severe.

lining blast furnace inwalls, and portions of blast furnace stove checker settings.

Certain properties of high alumina brick, such as alkali slag resistance and high-temperature load strength, can be improved by increasing the burning temperature during Table I establishes that brick made according to this invention which contain calcined bauxitic kaolin, which has been calcined in excess of 2950° F., and which brick have been burned above about 2750° F., have an unexpected increase in load-bearing strength and resistance to alkali attack. This is also apparent from a study of FIG. 2, which is a graphical representation of the data in Table I. Burning the brick to 2750° F., alone, is not sufficient to produce these properties, nor is calcining the bauxitic kaolin above 2950° F. The combination of both high-temperature calcining of the bauxitic kaolin and high-temperature burning of the brick provides a synergistic effect.

The load test was run according to the procedure for testing refractory brick under load at high temperatures adopted by the American Society for Testing and Materials, ASTM designation: C16–62. Schedule 6, which comprises heating the brick to 2900° F. and holding for ninety minutes, was followed.

The special alkali cup slag tests were run as follows: A hole one inch in diameter and three inches deep was drilled in the end of a brick sample (9 x 4½ x 2½") to be tested. Thirty-four grams of a 4 to 1 mixture $K_2CO_3$ and $Na_2CO_3$ were placed within the pocket. The brick were heated in an oxidizing atmosphere to 2200° F. within three hours and held at this temperature for five hours. After cooling, the brick samples were cut in half longitudinally through the slag pocket for examination. The brick were rated A, B and C, according to the degree of cracking and disruption that took place. FIG. 1 shows the general appearance of brick so rated.

In all of the batches discussed above, substantially the same size grading was maintained. The size grading was typically as follows: $-6+10$ mesh 10 to 15%, $-10+28$ mesh 24 to 30%, $-28+65$ mesh 13 to 17%, the remainder $-65$ mesh. Over 50% of the $-65$ mesh fraction was comprised of other than the calcined bauxitic kaolin.

The preferred mixes of this invention consist of about 50 to 70% calcined bauxitic kaolin, $-6$ mesh to ball mill fines; 5 to 20% of ball clay, all of which passes a 150 mesh screen; the remainder being calcined Alabama bauxite, most of which (70% or more, by weight) passes a 150 mesh screen.

Typical chemical analyses of the materials used in the above examples are as follows:

Fired shapes according to this invention are characterized by substantially true mineral homogeneity, through both the grain and the matrix, i.e., both the grain and the matrix are mullite with an excess of silica. The silica is in the heat-altered form, cristobalite. Further, since the total alkali content of the batch is kept below about 1% and, preferably, below 0.5%, there is substantially no vitrification and, microscopically, the brick components are crystalline. While the excess silica is substantially all in the form of cristobalite, some residual quartz can be detected.

Having thus described the invention in detail and with sufficient particularity as to enable those skilled in the art to practice it, what is desired to have protected by letters patent is set forth in the following claims.

We claim:
1. A method of making fired high alumina refractory shapes comprising the steps of:
   (1) calcining bauxitic kaolin above about 2950° F.;
   (2) preparing a size-graded refractory batch including, by weight, about 50–90% of said calcined bauxitic kaolin, the remainder being at least one material selected from the group consisting of finely divided calcined and crude aluminum ores, finely divided calcined and crude kaolin, and finely divided ball clay, the selected materials substantially all passing a 100 mesh screen, there being no more than about 1%, by weight, alkalies in the batch;
   (3) forming refractory shapes from said batch; and
   (4) burning said refractory shapes between about 2750 and 2850° F., said shapes being substantially free of vitrification, and being microscopically crystalline and characterized by substantially true mineral homogeneity, whereby the shapes have increased resistance to loads and alkali slag attack at elevated temperatures.

2. The method of claim 1 in which the calcined bauxitic kaolin is burned above about 3050° F.

|  | Calcined Alabama Bauxite | Calcined Kaolin | Crude Kaolin | Crude Bauxite | Air-Floated Ball Clay | Calcined Bauxitic Kaolin |
|---|---|---|---|---|---|---|
|  | Percent | Percent | Percent | Percent | Percent | Percent |
| Silica ($SiO_2$) | 21.3 | 52.0 | 44.8 | 15.5 | 62.9 | 37.4 |
| Alumina ($Al_2O_3$) | 75.0 | 44.9 | 38.7 | 54.6 | 30.9 | 59.9 |
| Titania ($TiO_2$) | 2.6 | 1.6 | 1.4 | 1.9 | 1.4 | 2.0 |
| Iron Oxide ($Fe_2O_3$) | 1.1 | 1.3 | 1.1 | 0.8 | 2.6 | 0.9 |
| Lime (CaO) | 0.1 | 0.1 | 0.1 | 0.1 | 0.6 | 0.03 |
| Magnesia (MgO) | Trace | 0.1 | 0.1 | Trace | 0.8 | 0.03 |
| Alkalies | 0.1 | 0.3 | 0.3 | 0.1 | 0.8 | 0.05 |
| Ignition Loss |  |  | 13.9 | 27.2 |  |  |

Brick according to this invention have excellent resistance to attack by such alkalies as are present in the blast furnace. This is due, to a great extent, to the heat-altered silica in the form of cristobalite, which is found in our calcined bauxitic kaolin grain. The cristobalite, in some manner, appears to react with the attacking alkalies, causing an extremely viscous melt to be formed, thereby substantially reducing penetration. The reduction in penetration is far greater than would be expected from a mere decrease in brick porosity.

3. The method of claim 1 in which the calcined bauxitic kaolin is burned above about 3150° F.
4. Shapes made according to the method of claim 1.

References Cited

UNITED STATES PATENTS 3,241,989   3/1966   Wishon et al. _____ 106—65

HELEN M. McCARTHY, *Primary Examiner*,

JAMES E. POER, *Examiner*.